(12) United States Patent
Zhang et al.

(10) Patent No.: US 11,329,748 B2
(45) Date of Patent: May 10, 2022

(54) SERVICE TRANSMISSION METHOD AND DEVICE USING FLEXIBLE OPTICAL NETWORK, EQUIPMENT AND STORAGE MEDIUM

(71) Applicant: ZTE Corporation, Shenzhen (CN)

(72) Inventors: Yuanbin Zhang, Shenzhen (CN); Yan Yuan, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 0 days.

(21) Appl. No.: 17/252,813

(22) PCT Filed: Apr. 11, 2019

(86) PCT No.: PCT/CN2019/082271
§ 371 (c)(1),
(2) Date: Dec. 16, 2020

(87) PCT Pub. No.: WO2020/001127
PCT Pub. Date: Jan. 2, 2020

(65) Prior Publication Data
US 2021/0281343 A1    Sep. 9, 2021

(30) Foreign Application Priority Data

Jun. 26, 2018 (CN) .......................... 201810672981.2

(51) Int. Cl.
*H04B 10/27* (2013.01)
*H04J 3/16* (2006.01)

(52) U.S. Cl.
CPC ............ *H04J 3/1652* (2013.01); *H04B 10/27* (2013.01)

(58) Field of Classification Search
CPC .......................... H04B 10/27; H04B 10/0795; H04B 10/6932; H04J 14/00
See application file for complete search history.

(56) References Cited

U.S. PATENT DOCUMENTS

| 2009/0323713 | A1 | 12/2009 | Futch | |
| 2013/0101292 | A1* | 4/2013 | Lanzone | H04J 3/1652 398/66 |

(Continued)

FOREIGN PATENT DOCUMENTS

| CN | 101729940 A | 6/2010 |
| CN | 101800912 A | 8/2010 |

(Continued)

OTHER PUBLICATIONS

International Search Report for corresponding application PCT/CN2019/082271 filed Apr. 11, 2019; dated Jul. 24, 2019.

(Continued)

*Primary Examiner* — Dzung D Tran
(74) *Attorney, Agent, or Firm* — Cantor Colburn LLP (57) ABSTRACT

Provided are a service transmission method and device using a FlexO, equipment and a storage medium. The method includes: customer service data is mapped into N FlexO frames on M Physical Layer links of a FlexO transmission group, and then the N FlexO frames are sent through the FlexO transmission group; and a receiving end sequentially extracts the customer service data from the N FlexO frames. The FlexO transmission group comprises M PHY links. The customer service data occupies the same number of cells in the FlexO frame of each PHY link, and cell locations of the occupied cells are the same. A set of logic is used to directly map the customer service data into the N FlexO frames on (Continued)

S501 The number of cells needing to be occupied by the customer service data in each FlexO frame is determined according to a service bandwidth of the service that the customer service data belongs to and N times a cell bandwidth of the cell in the FlexO frame S502 The location of each cell needing to be occupied by the customer service data in each FlexO frame is determined according to the number of cells needing to be occupied by the customer service data in each FlexO frame and the number of currently remaining idle cells (that is, the cells not occupied) in each FlexO frame S503 The customer service data is mapped in turn to the cell at the corresponding location in each FlexO frame the M PHY links of the FlexO transmission group, so as to minimize complexity and logical resources needing to be occupied.

20 Claims, 6 Drawing Sheets

(56) References Cited

U.S. PATENT DOCUMENTS

| | | | | |
|---|---|---|---|---|
| 2016/0044392 | A1* | 2/2016 | Surek | H04J 3/1652 398/45 |
| 2020/0235905 | A1* | 7/2020 | Su | H04W 88/085 |
| 2021/0083774 | A1* | 3/2021 | Su | H04L 29/02 |
| 2021/0084383 | A1* | 3/2021 | Xiang | H04J 3/1658 |

FOREIGN PATENT DOCUMENTS

| | | |
|---|---|---|
| CN | 103891222 A | 6/2014 |
| CN | 108075903 A | 5/2018 |
| WO | 2014166077 A1 | 10/2014 |

OTHER PUBLICATIONS

European Search Report for corresponding application EP 19 82 5374; Report dated Jul. 27, 2021.
Jean Michel Gaia Fiberhome, "FlexO25n Multiplexing and Overhead Structures for 25G/50G M-OTN interfaces", vol. 11/15, 12/15, May 28, 2018, pp. 1-16, XP044246742.
Jean Michel Gaia Fiberhome, "nx25G Flex0 bit rate, FEC and Client mapping options for next generation Mobile Fronthaul Transport", vol. 11/15, Jun. 3, 2017, pp. 1-12, XP044212461.
Sebastien Gareau, "Flexible OTN interface domain interface", vol. 11/15, May 2, 2016, pp. 1-23 XP044178936.

* cited by examiner

S501 The number of cells needing to be occupied by the customer service data in each FlexO frame is determined according to a service bandwidth of the service that the customer service data belongs to and N times a cell bandwidth of the cell in the FlexO frame S502 The location of each cell needing to be occupied by the customer service data in each FlexO frame is determined according to the number of cells needing to be occupied by the customer service data in each FlexO frame and the number of currently remaining idle cells (that is, the cells not occupied) in each FlexO frame S503 The customer service data is mapped in turn to the cell at the corresponding location in each FlexO frame

| | 1 | | | | | | | | | | 29 30 | 31 32 | 40 |
|---|------|------|-------|-----|-----|-----|-----|-----|-----|------|--------|-------------|-----|
| 1 | MFAS | STAT | GID   | GID | GID | RES | PID | MAP | CRC | FCC | OSMC | ODU #1 | Num of cells | |
| 2 | MFAS | STAT | AVAIL | | | | | MAP | CRC | FCC | OSMC | ODU #2 | Num of cells | |
| 3 | MFAS | STAT | | | | | | MAP | CRC | FCC | OSMC | ODU #3 | Num of cells | |
| 4 | MFAS | STAT | | | | | | MAP | CRC | FCC | OSMC | ODU #4 | Num of cells | RES |
| 5 | MFAS | STAT | | RES | | | | MAP | CRC | FCC | OSMC | ODU #5 | Num of cells | |
| 6 | MFAS | STAT | | | | | | MAP | CRC | FCC | OSMC | ODU #6 | Num of cells | |
| 7 | MFAS | STAT | | | | | | MAP | CRC | FCC | OSMC | ODU #7 | Num of cells | |
| 8 | MFAS | STAT | | | | | | MAP | CRC | FCC | OSMC | ODU #8 | Num of cells | |

SERVICE TRANSMISSION METHOD AND DEVICE USING FLEXIBLE OPTICAL NETWORK, EQUIPMENT AND STORAGE MEDIUM

TECHNICAL FIELD

The present disclosure relates to the technical field of communications, in particular to a service transmission method and device using a Flexible Optical Transport Network (FlexO), equipment and a storage medium.

BACKGROUND

FlexO standards, developed by the International Telecommunication Union (ITU-T), are important standards for an optical transmission device. An important characteristic of a FlexO transmission group is to realize a function of carrying a large bandwidth service by binding multiple Physical Layer (PHY) links with the same rate, referring to FIG. 1. For example, 4 PHY links of 100G are bound to support a medium to access a customer service with a control rate of 400G, that is, the customer service is transmitted in multiple PHY links.

In related FlexO standards, for a mapping path of services, the services with different bandwidths are first mapped to a corresponding flexible Optical Channel Data Unit (ODU), namely ODUflex, then one or more ODUflex are multiplexed to an Optical Transform Unit (OUT) Cn of an Optical Transport Network (OTN) of B100G. There are time slots defined in the OTUCn, which may realize the multiplexing of multiple services. The current standard stipulates that the granularity of each time slot is 5G. After that, the OTUCn is divided into n OTUCs, and each OTUC is mapped to its own FlexO frame. Data of the FlexO frame is sent through an optional module with the corresponding rate. There is no time slot in the FlexO frame, but only a layer of encapsulation for the OTUC.

Figure 1:
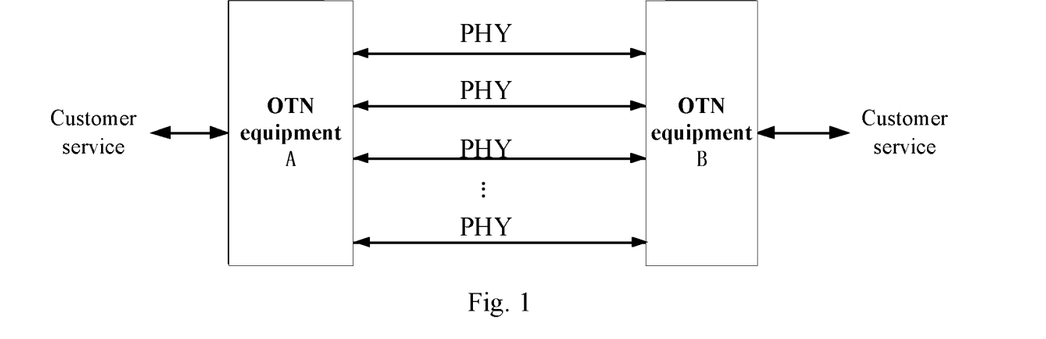
FIG. 1 is a schematic diagram of networking of a FlexO.

5G bearing is one of the hottest research topics in the industry, and the FlexO becomes a potential technology for the 5G bearing due to its support for binding, channeling and other functions. In order to flatten a mapping multiplexing hierarchy, the current idea is to merge a FlexO layer and an OTUCn layer, that is, the time slots are defined directly in a net load area of the FlexO frame, and one or more ODUflex is directly multiplexed in the FlexO frame. However, as shown in FIG. 1, because the FlexO binds multiple PHYs, the ODUflex may be mapped to the time slot of the FlexO frame of any PHY, which causes very high complexity in implementation of service transmission and high occupancy of logical processing units. Moreover, the complexity and occupancy of logical resources will increase with the increase in the number of PHYs bound.

SUMMARY

The main technical problem to be solved by a service transmission method and device using a FlexO, equipment and a storage medium which are provided by the embodiments of the present disclosure is high mapping complexity and high occupancy of logical resources during the implementation of service transmission using the related FlexO.

To solve the above-mentioned technical problem, the embodiments of the present disclosure provide a service transmission method using a FlexO, which may include the following steps: Customer service data is mapped into N FlexO frames on M PHY links of a FlexO transmission group; the N FlexO frames are sent through the FlexO transmission group; the FlexO transmission group comprises M PHY links, wherein the M is greater than or equal to 1, and the N is greater than or equal to the M. The customer service data occupies the same number of cells in the FlexO frame of each PHY link, and cell locations of the occupied cells are the same.

To solve the above-mentioned technical problem, the embodiments of the present disclosure also provide a service transmission method using a FlexO, which may include the following steps: N FlexO frames transmitted by using the FlexO transmission group are received; the customer service data is sequentially extracted from the N FlexO frames; the FlexO transmission group comprises M PHY links, wherein the M is greater than or equal to 1. The N FlexO frames are the FlexO frames in the M PHY links. The customer service data occupies the same number of cells in the FlexO frame of each PHY link, and the cell locations of the occupied cells are the same.

To solve the above-mentioned technical problem, the embodiments of the present disclosure also provide a service transmission device using a FlexO, which may include a data processing module and a data sending module.

The data processing module is configured to map the customer service data into the N FlexO frames on the M PHY links of the FlexO transmission group.

The data sending module is configured to send the N FlexO frames through the FlexO transmission group.

The FlexO transmission group comprises M PHY links, wherein the M is greater than or equal to 1, and the N is greater than or equal to the M. The customer service data occupies the same number of cells in the FlexO frame of each PHY link, and the cell locations of the occupied cells are the same.

To solve the above-mentioned technical problem, the embodiments of the present disclosure also provide a service transmission device using a FlexO, which may include a receiving module and a parsing module.

The receiving module is configured to receive the N FlexO frames transmitted by using the FlexO transmission group.

The parsing module is configured to sequentially extract the customer service data from the N FlexO frames.

The FlexO transmission group comprises M PHY links, wherein the M is greater than or equal to 1. The N FlexO frames are the FlexO frames in the M PHY links. The customer service data occupies the same number of cells in the FlexO frame of each PHY link, and the cell locations of the occupied cells are the same.

To solve the above-mentioned technical problem, the embodiments of the present disclosure also provide sending end equipment, which includes: a first processor, a first memory and a first communication bus.

The first communication bus is configured to realize the communication connection between the first processor and the first memory.

The first processor is configured to execute one or more first program stored in the first memory, so as to implement the steps of the service transmission method using a FlexO.

To solve the above-mentioned technical problem, the embodiments of the present disclosure also provide receiving end equipment, which includes: a second processor, a second memory and a second communication bus.

The second communication bus is configured to realize the communication connection between the second processor and the second memory.

The second processor is configured to execute one or more second program stored in the second memory, so as to implement the steps of the service transmission method using a FlexO.

To solve the above-mentioned technical problem, the embodiments of the present disclosure also provide a computer-readable storage medium, which stores one or more first program. The one or more first program may be executed by one or more processor, so as to implement the steps of the service transmission method using a FlexO. Or, the computer-readable storage medium stores one or more second program. The one or more second program may be executed by one or more processor, so as to implement the steps of the service transmission method using a FlexO.

The present disclosure may achieve the following beneficial effects:

with the service transmission method and device using a FlexO, equipment and a storage medium provided by the embodiments of the present disclosure, the customer service data is mapped into N FlexO frames on M PHY links of the FlexO transmission group, and then the N FlexO frames are sent through the FlexO transmission group; and a receiving end sequentially extracts the customer service data from the N FlexO frames. The FlexO transmission group comprises M PHY links. The customer service data occupies the same number of cells in the FlexO frame of each PHY link, and the cell locations of the occupied cells are the same. That is, the embodiments of the present disclosure use a set of logic to directly map the customer service data into the N FlexO frames on the M PHY links of the FlexO transmission group, so as to minimize complexity and logical resources needing to be occupied.

Other features and corresponding beneficial effects of the present disclosure are elaborated in the latter part of the specification, and it should be understood that at least some of the beneficial effects become apparent from the records in the specification.

DETAILED DESCRIPTION OF THE EMBODIMENTS

For making the purpose, technical solutions and the advantages of disclosure more clear, the embodiments of the present disclosure are further elaborated below by means of exemplary implementation modes combined with the accompanying drawings. It should be understood that the exemplary embodiments described here are intended only to explain the present disclosure and rather than limiting it.

Embodiment One

For solving the problem of high mapping complexity and high occupancy of logical resources during the implementation of service transmission by using a related FlexO, in a service transmission method using a FlexO provided by the present embodiment, customer service data is mapped into N FlexO frames on M PHY links of a FlexO transmission group, and the customer service data occupies the same number of cells in the FlexO frame of each PHY link, and cell locations of the occupied cells are the same; that is, a set of logic is used to directly map the customer service data into the N FlexO frames on the M PHY links of the FlexO transmission group. That is, in the present embodiment, N FlexO frames on the M PHY links are merged into a logical whole frame, and then service mapping may be implemented using a set of logic, which can minimize complexity and logical resources needing to be occupied.

In the present embodiment, assuming that there are M PHY links between sending end equipment and receiving end equipment (that is, the FlexO transmission group used between the sending end equipment and the receiving end equipment has M PHY links), then when the FlexO frames are merged logically to obtain a logical whole frame, N FlexO frames on the M PHY links are directly merged logically, wherein M is greater or equal to 1. The N FlexO frames include the FlexO frames of the M PHY links. The customer service data occupies the same number of cells in the FlexO frame of each PHY link, and the cell locations of the occupied cells are the same.

In the present embodiment, the type of the customer service data may be flexibly set according application scenarios, including, but not limited to, at least one of ODU service data, Ethernet service data or Synchronous Digital Hierarchy (SDH) service data.

In the present embodiment, N is greater than or equal to M, and the value of N is generally an integer multiple of M.

The rates of M PHY links of the FlexO transmission group are generally the same. The method is also applicable to a situation where the rates of the M PHY links are different. When the bandwidth of the PHY link is the same as that of the FlexO frame, N and M are equal. When the bandwidth of the PHY link is L (L is greater than or equal to 2) times the bandwidth of the FlexO frame, N is equal to L*M.

In an example, assuming that the FlexO transmission group includes M PHY links of 100G, and the bandwidth of the FlexO frame on each PHY link is 100G, then M is equal to N.

In another example, assuming that the FlexO transmission group includes M PHY links of 200G, and the bandwidth of the FlexO frame on each PHY link is 100G, that is, the value of L is 2, then N is equal to 2*M. It should be understood that in this case, in the PHY link of 200G, the customer service data comprises two interlaced FlexO frames of 100G, and when L is an integer greater than 2, the rest can be done in the same manner.

To sum up, in an application scenario of the present embodiment, the bandwidth of the M PHY links may be set as equal to the bandwidth of the FlexO frame on each of the M PHY links.

Figure 2:
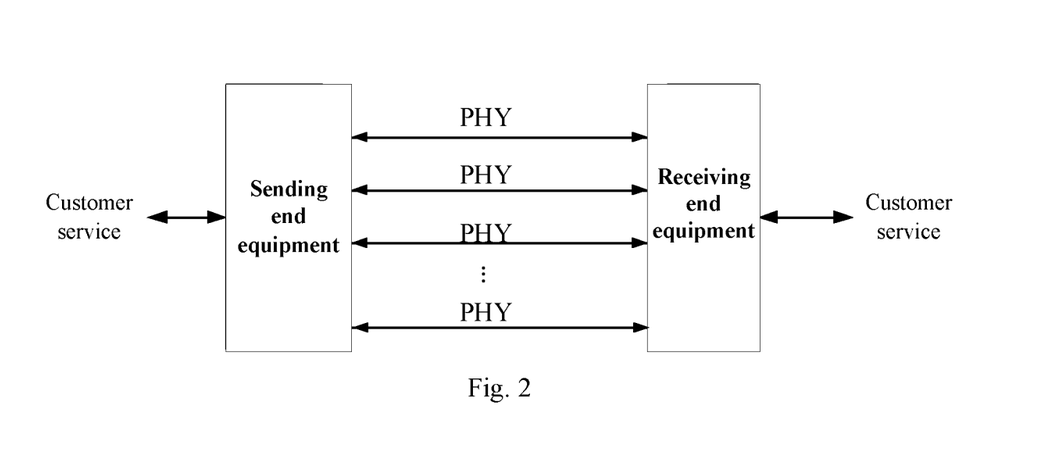
FIG. 2 is a schematic diagram of networking of a FlexO according to the first embodiment of the present disclosure.

For example, in an application scenario, referring to FIG. 2, there are 4 PHY links bound between the sending end equipment and the receiving end equipment, and the bandwidth of the FlexO frame on each PHY link is equal to the bandwidth of the PHY link. Assuming that the numbers of the 4 PHY links are 1, 2, 3 and 4, then correspondingly, the numbers of the FlexO frames of the 4 PHY links are also 1, 2, 3 and 4. It should be understood that the exemplary number sequence here may be flexibly adjusted. In an example, assuming that the 4 PHY links have the same rate, for example, 25G, then the FlexO frames on the 4 PHY links may be logically merged into a logical whole frame. Each FlexO frame included in the logical whole frame is transmitted on its own PHY link, that is, each FlexO frame included in the logical whole frame is relatively independent. However, there is only one mapping situation when the customer service data is mapped, that is, only one set of logic is required, thus minimizing the complexity and resource occupancy of implementing service transmission.

As shown in the above examples, in the present embodiment, logically merging N FlexO frames is only a logical operation to facilitate mapping the customer service data and calculating the cell location occupied by it, and the N FlexO frames are not merged actually. An exemplary merging manner will be explained in a subsequent example.

Figure 3:
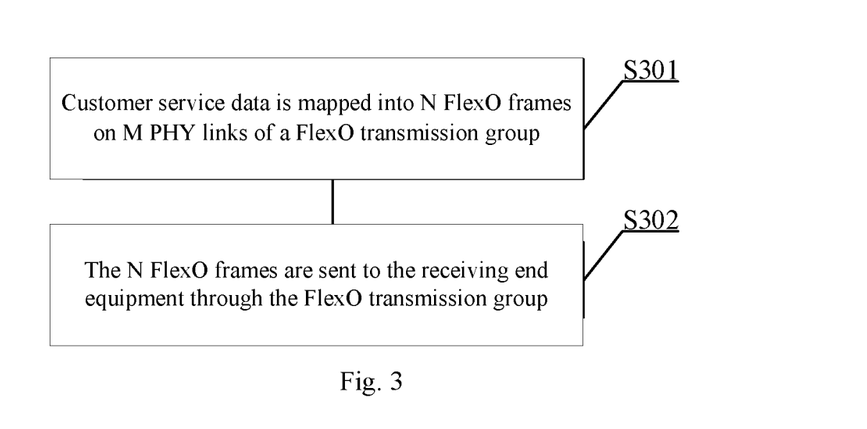
FIG. 3 is a flowchart of a service transmission method using a FlexO at a sending end according to the first embodiment of the present disclosure.

Referring to FIG. 3, the service transmission method using a FlexO at a sending end includes the following steps.

At S301, customer service data is mapped into N FlexO frames on M PHY links of a FlexO transmission group.

As shown above, in this case, the N FlexO frames on the M PHY links of may be logically regarded as a logical whole frame, and each FlexO frame included in the logical whole frame is transmitted on its own PHY link.

In the present embodiment, a non-OTN type service may be first mapped to an ODU signal in various mapping manners, which include, but not limited to, Asynchronous Mapping Procedure (AMP), Bit-synchronous Mapping Procedure (BMP), Generic Mapping Procedure (GMP), and Frame mapped Generic Framing Procedure (GFP-F); and an OTN type service is directly de-encapsulated to the ODU signal.

At S302, the N FlexO frames are sent to the receiving end equipment through the FlexO transmission group.

When sent, each FlexO frame is sent to the receiving end equipment by means of a corresponding optical module and its own PHY link.

For a better understanding, the present embodiment is illustrated below with an example of logical merging.

Figure 4:
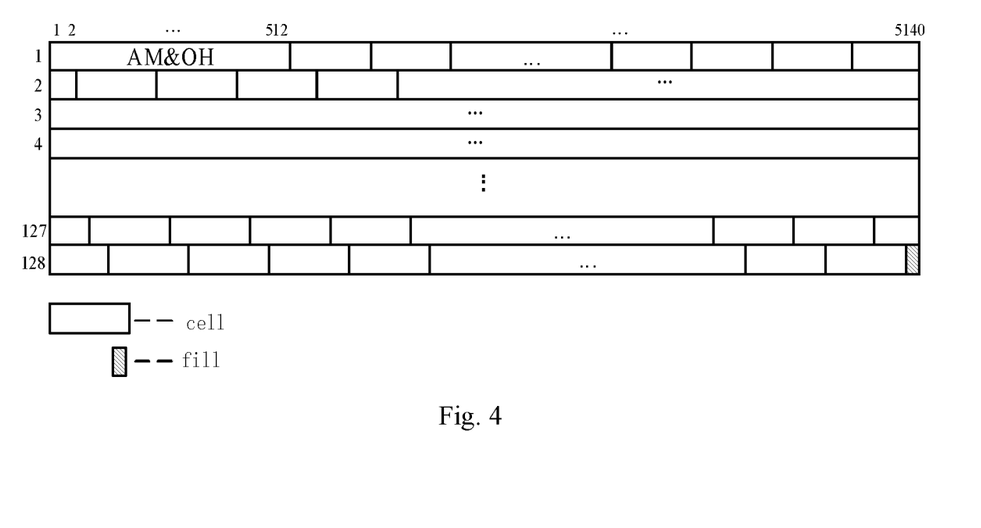
FIG. 4 is a schematic diagram of dividing a FlexO frame according to the first embodiment of the present disclosure.

In the present embodiment, a net load area of the FlexO frame on the PHY link is divided into multiple fixed-size cells, and the number of cells depends on the size of the cells and the size of the net load area of the FlexO frame. When the net load area of the FlexO frame is fixed, the larger the cell is, the smaller the number of cells is; conversely, the smaller the cell is, the larger the number of cells is. In the present embodiment, the sizes of cell may also be set flexibly, such as 64 bits, 128 bits and 256 bits. The bandwidth of each cell is proportional to the bandwidth of the FlexO frame, and a schematic diagram of dividing the FlexO frame by the cell is shown in FIG. 4.

As shown in the above analysis, when N FlexO frames are bound between the sending end and the receiving end to transmit the services, the N FlexO frames may be logically merged into a whole FlexO frame, correspondingly, the bandwidth of the logical whole FlexO frame is increased by N times, and the bandwidth of cell in the whole FlexO frame is increased by N times.

Figure 5:
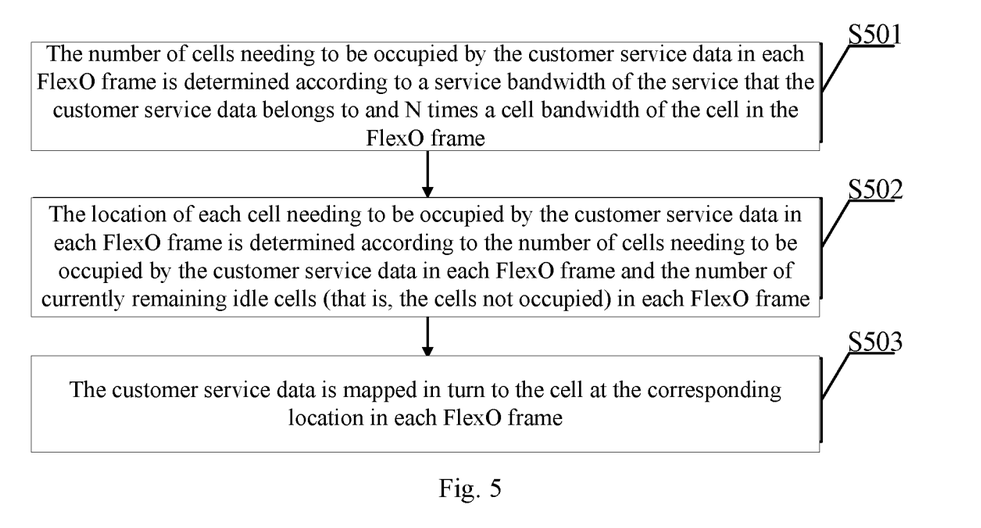
FIG. 5 is a flowchart of mapping customer service data into a FlexO frame according to the first embodiment of the present disclosure.

Based on the logically merging manner in the above example, referring to FIG. 5, the process of carrying the customer service data to be sent in the net load area of the logical whole frame in the present embodiment includes the following steps.

At S501, the number of cells needing to be occupied by the customer service data in each FlexO frame is determined according to a service bandwidth of the service that the customer service data belongs to and N times a cell bandwidth of the cell in the FlexO frame.

In the present embodiment, the number of cells needing to be occupied by the customer service data in each FlexO frame may be obtained by dividing the service bandwidth of the customer service data by N times the cell bandwidth, and rounding up the quotient.

At S502, the location of each cell needing to be occupied by the customer service data in each FlexO frame is determined according to the number of cells needing to be occupied by the customer service data in each FlexO frame and the number of currently remaining idle cells (that is, the cells not occupied) in each FlexO frame.

In the present embodiment, the location of each cell needing to be occupied by the customer service data in each FlexO frame may be calculated using the sigma-delta algorithm. It should be understood that determination of the location is not limited to the exemplary algorithm, any other algorithm that can realize the function may also be applied.

At S503, the customer service data is mapped in turn to the cell at the corresponding location in each FlexO frame.

Figure 6:
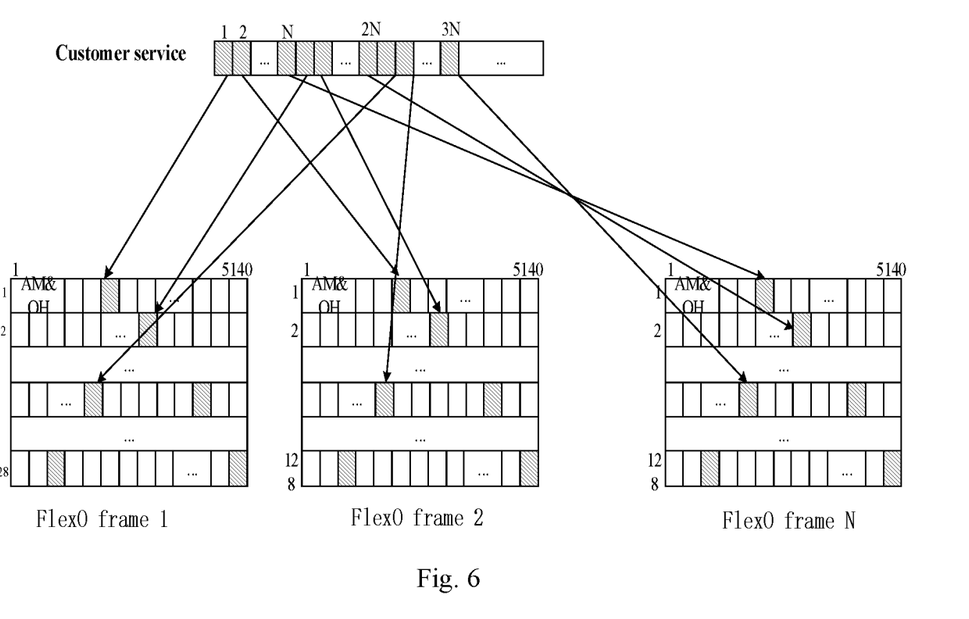
FIG. 6 is a schematic diagram of mapping customer service data according to the first embodiment of the present disclosure.

For example, the customer service data is mapped to the cell at the corresponding location in the FlexO frame in a unit of cell size in the net load area of the FlexO frame. In an example, a sequence may be that the customer service data is mapped in turn to the cell at the corresponding location in the FlexO frame in an ascending order of the frame numbers of the FlexO frames (it should be understood that the sequence may be set flexibly, for example, the customer service data is mapped in a descending order or other interval sequences). Specifically, according to the calculated location of each cell occupied by the service in each FlexO frame, the service may be loaded on the cell at the corresponding location of the N FlexO frames in an ascending order of the numbers of the N FlexO frames, referring to FIG. 6. The cell locations carrying the same service in each FlexO frame are the same, that is, the processing logic of each FlexO frame is the same, which greatly simplifies hardware implementation.

In the present embodiment, after the number of cells needing to be occupied by the customer service data in each FlexO frame is obtained, the method further includes that: the number of cells needing to be occupied by the customer service data in each FlexO frame and the service type of the customer service data are set in the overhead of at least one FlexO frame.

Figure 7:
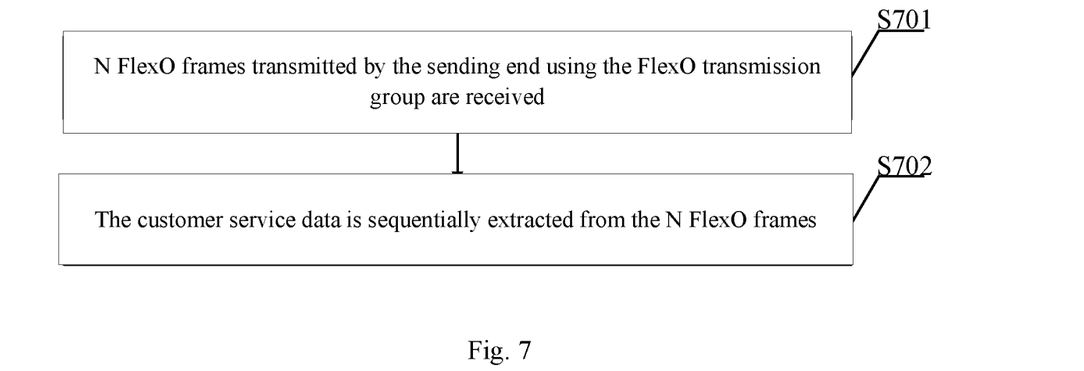
FIG. 7 is a flowchart of a service transmission method using a FlexO at a receiving end according to the first embodiment of the present disclosure.

Correspondingly, referring to FIG. 7, the service transmission method using a FlexO at the receiving end includes the following steps.

At S701, N FlexO frames transmitted by the sending end using the FlexO transmission group are received.

At S702, the customer service data is sequentially extracted from the N FlexO frames (that is, the N FlexO frames belonging to a logical whole frame).

In the present embodiment, the overhead of at least one FlexO frame includes the number of cells needing to be occupied by the customer service data in each FlexO frame and the service type of the customer service data.

In the present embodiment, the overhead of at least one FlexO frame at least includes the number of whole frame cells occupied by the service of the customer service data.

Figure 8:
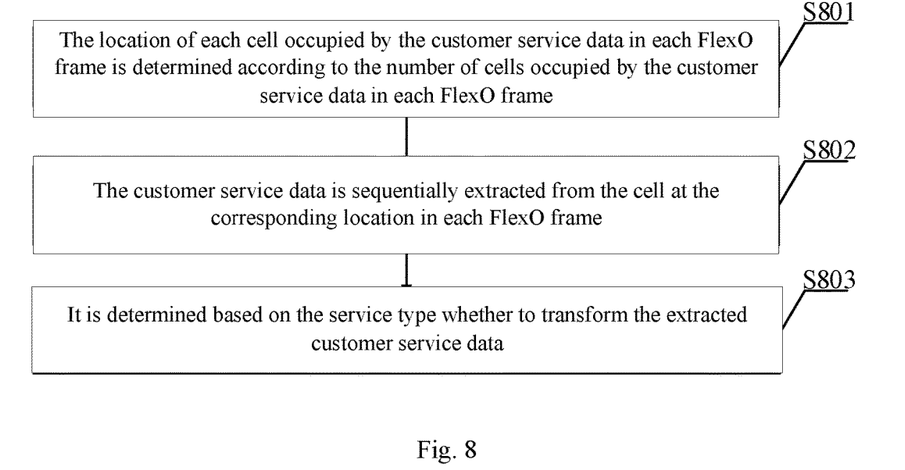
FIG. 8 is a flowchart of a customer service data obtaining process according to the first embodiment of the present disclosure.

Referring to FIG. 8, that the customer service data is sequentially extracted from the N FlexO frames includes the following steps.

At S801, the location of each cell occupied by the customer service data in each FlexO frame is determined according to the number of cells occupied by the customer service data in each FlexO frame.

At S802, the customer service data is sequentially extracted from the cell at the corresponding location in each FlexO frame.

At S803, it is determined based on the service type whether to transform the extracted customer service data.

For example, when a service is determined as the non-OTN type service according to the service type in the overhead, the method further includes that the obtained customer service data is unmapped to restore transformation processing of the original data service.

Based on the above analysis, it can be seen that in the present embodiment, taking an ODU service for example, a service transport process exemplarily includes that:

at the sending end, the non-OTN type service is first mapped to the ODU signal in a mapping manner, and the OTN type service is directly de-encapsulated to the ODU signal;

then, when H ODU services are multiplexed N FlexO frames, the N FlexO frames are merged into a whole FlexO frame, the number of cells occupied by the ODU services in the whole FlexO frame according to a relationship between the bandwidth of the ODU service and the cell bandwidth of the whole FlexO frame (that is, N times the cell bandwidth of the cells in the FlexO frame), and the corresponding locations of these cells in the FlexO frame are calculated according to the sigma-delta algorithm.

The N FlexO frames are sorted in order of numbers from small to large, and the customer service data is carried (that is, mapped) in turn to the corresponding cell locations of the N FlexO frames according to the cell location of each ODU service in the whole FlexO frame.

Figure 9:
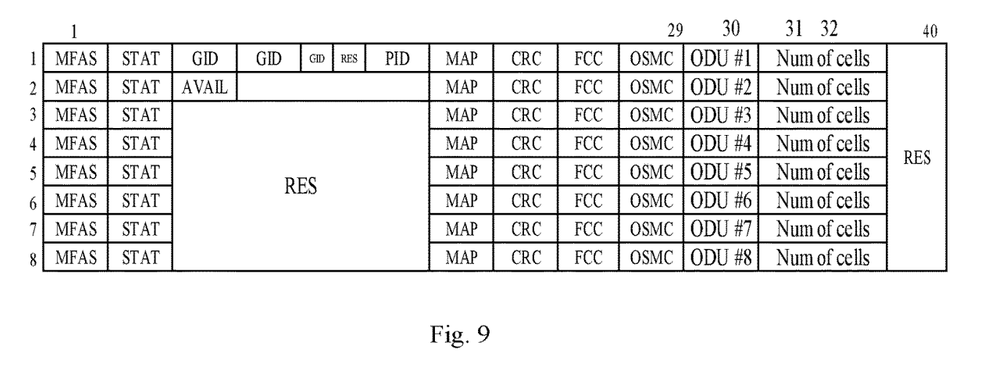
FIG. 9 is a schematic diagram of an overhead of a FlexO frame according to the first embodiment of the present disclosure.

When the service type and the number of cells occupied are stored in the overhead of the FlexO frame, they may only be stored in the overhead of the FlexO frame with the smallest number, and the overhead transmission of M ODU services may be completed in a multi-frame manner; they may also be stored in the overhead of each FlexO frame. A schematic diagram of the overhead of a FlexO frame is shown in FIG. 9. If H≤N, then the overhead transmission of H ODU services can be completed within one cycle. If H>N, then the overhead transmission of H ODU services needs to be completed in ceil(H/N) cycles. The overheads of H ODU services may be carried in an overhead area of N FlexO frames in an ascending order. The N FlexO frames are sent through K optical modules, wherein N≥K.

At the receiving end, optical signals are obtained from K optical modules to obtain the FlexO frames, and the FlexO frames are sorted in order of numbers from small to large.

Service type information of the ODU service and the number of cells occupied are obtained from the overhead of the FlexO frame.

According to the number of cells occupied by the ODU service and the total number of cells in the net load area of the FlexO frame, the location of the cell in the net load area of the FlexO frame is obtained according to the sigma-delta algorithm, and ODU service data (that is, the ODU signal) is extracted from the cell at the corresponding location in the N FlexO frames in an ascending order.

For the non-OTN type service, the extracted ODU signal is unmapped to restore the original data service.

It can be seen that in the present embodiment, the FlexO frames of N PHY links between the sending end equipment and the receiving end equipment are logically merged into a logical whole frame, then a mapping operation may be implemented using a set of logic, which greatly reduces the complexity of mapping when service transmission is implemented using the FlexO and reduces the occupied logical resources.

Embodiment Two

Figure 10:
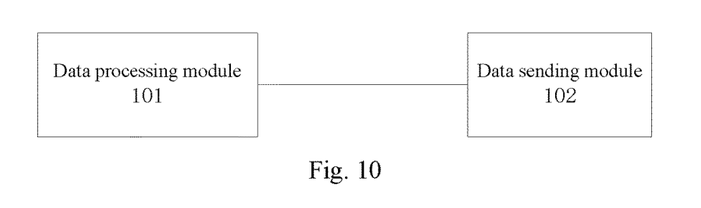
FIG. 10 is a structural schematic diagram of a service transmission device using a FlexO at a sending end according to the second embodiment of the present disclosure.

The present embodiment provides a service transmission device using a FlexO, which may be provided in the sending end equipment. Referring to FIG. 10, the device includes a data processing module 101 and a data sending module 102.

The data processing module 101 is configured to map the customer service data into the N FlexO frames on the M PHY links of the FlexO transmission group.

As shown in the above embodiments, the FlexO transmission group comprises M PHY links, wherein the M is greater than or equal to 1, and the N is greater than or equal to the M. The customer service data occupies the same number of cells in the FlexO frame of each PHY link, and the cell locations of the occupied cells are the same.

The data sending module 102 is configured to send the N FlexO frames through the FlexO transmission group.

In the present embodiment, transmission rates of the M PHY links are the same, and of course, referring to the analysis in the above embodiments, the M PHY links are limited to the same transmission rate.

In the present embodiment, the data processing module 101 may be exemplarily configured to determine the number of cells needing to be occupied by the customer service data in each FlexO frame according to the service bandwidth of the service to which the customer service data belongs and N times the cell bandwidth of the cells in the FlexO frame, determine the location of each cell needing to be occupied by the customer service data in each FlexO frame according to the number of cells needing to be occupied by the customer service data in each FlexO frame and the number of currently remaining idle cells (that is, the cells not occupied) in each FlexO frame, and map the customer service data in turn to the cell at the corresponding location in each FlexO frame.

Specifically, the data processing module 101 may obtain the number of cells needing to be occupied by the customer service data in each FlexO frame by dividing the service bandwidth of the customer service data by N times the cell bandwidth, and rounding up the quotient. The specific mapping process is shown in the first embodiment and will not be repeated here.

Moreover, it should be understood that functions of the data processing module 101 and the data sending module 102 may be realized through a processor or a controller in the sending end equipment.

Figure 11:
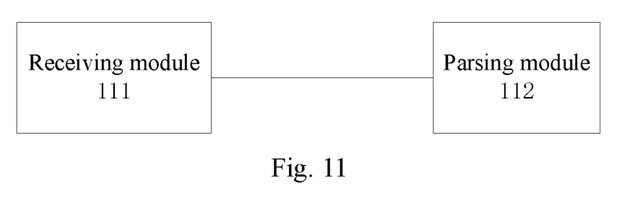
FIG. 11 is a structural schematic diagram of a service transmission device using a FlexO at a receiving end according to the second embodiment of the present disclosure.

Referring to FIG. 11, the present embodiment also provides a service transmission device using a FlexO which may be provided in the receiving end equipment. The device includes a receiving module 111 and a parsing module 112.

The receiving module 111 is configured to receive the N FlexO frames transmitted by the sending end using the FlexO transmission group.

The parsing module 112 is configured to sequentially extract the customer service data from the N FlexO frames (that is, the N FlexO frames belonging to a logical whole frame).

As shown above, the logical whole frame is obtained by merging N FlexO frames in the M PHY links between the sending end equipment and the receiving end equipment. Each FlexO frame included in the logical whole frame is transmitted on its own PHY link.

In the present embodiment, the overhead of at least one FlexO frame includes the number of cells needing to be occupied by the customer service data in each FlexO frame and the service type of the customer service data. The parsing module 112 is configured to determine the location of each cell occupied by the customer service data in each FlexO frame according to the number of cells needing to be occupied by the customer service data in each FlexO frame, sequentially extract the customer service data from the cell at the corresponding location in each FlexO frame, and determine based on the service type whether to transform the extracted customer service data.

The exemplary process that the parsing module 112 extracts the customer service data is shown in the above embodiment and will not be repeated here.

It should be understood that functions of the data receiving module 111 and the parsing module 112 in the present embodiment may be exemplarily realized through a processor or a controller in the receiving end equipment.

Figure 12:
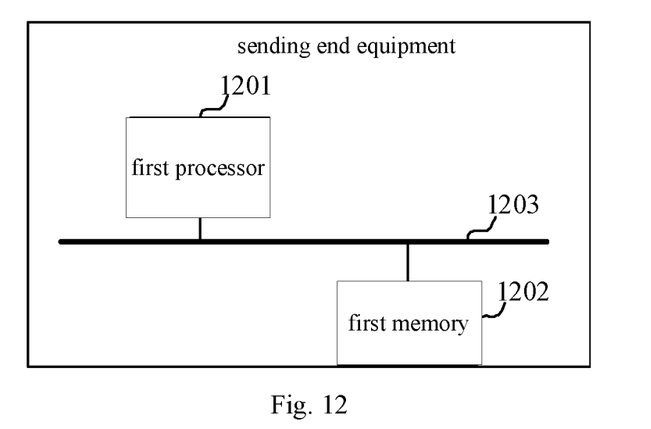
FIG. 12 is a structural schematic diagram of sending end equipment according to the second embodiment of the present disclosure.

The present embodiment also provides sending end equipment, which may be OTN equipment and includes, referring to FIG. 12, a first processor 1201, a first memory 1202 and a first communication bus 1203.

The first communication bus 1203 is configured to realize a communication connection between the first processor 1201 and the first memory 1202.

The first processor 1201 is configured to execute one or more first program stored in the first memory 1202, so as to implement the steps of the service transmission method using a FlexO at the sending end in the above embodiments.

Figure 13:
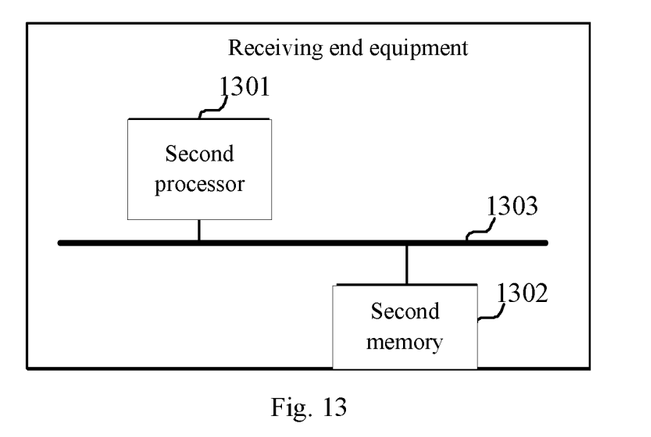
FIG. 13 is a structural schematic diagram of receiving end equipment according to the second embodiment of the present disclosure.

The present embodiment also provides receiving end equipment, which may be OTN equipment and includes, referring to FIG. 13, a second processor 1301, a second memory 1302 and a second communication bus 1303.

The second communication bus 1303 is configured to realize a communication connection between the second processor 1301 and the second memory 1302.

The second processor 1301 is configured to execute one or more second program stored in the second memory 1302, so as to implement the steps of the service transmission method using a FlexO at the receiving end in the above embodiments.

The present embodiment also provides a computer-readable storage medium, which stores one or more first program. The one or more first program may be executed by one or more processor, so as to implement the steps of the service transmission method using a FlexO at the sending end.

Or, the computer-readable storage medium stores one or more second program. The one or more second program may be executed by one or more processor, so as to implement the steps of the service transmission method using a FlexO at the receiving end.

It should be understood that the computer-readable storage medium may be provided in the sending end equipment and/or the receiving end equipment.

In order to facilitate understanding the technical solution provided by the present disclosure, the present disclosure is further illustrated below taking two specific application scenarios for example.

First Scenario

Figure 14:
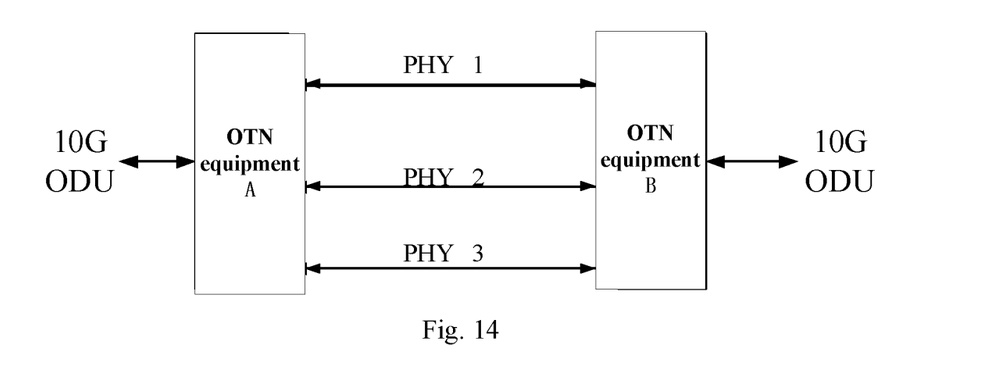
FIG. 14 is a schematic diagram of networking of a FlexO in the first scenario according to the second embodiment of the present disclosure.

In the application scenario, two pieces of OTN equipment transmit an ODU service the bandwidth of which is 10G (it should be understood that it may also be other types of service) by binding the FlexO transmission groups of three PHY links of 25G. The numbers of the FlexO frames on the three PHY links are respectively 1, 2 and 3, and the extra bandwidth may be used to transmit other services, as shown in FIG. 14. The service transmission process in the scenario includes that:

the size of cell is set to 128 bits, the size of net load area of a FlexO frame is (128*5140-1280)=656640 bits, a total of 656640/128=5130 cells may be defined, and the bandwidth of each cell is FlexO net load bandwidth/5130, which is about 5M.

At the sending end, three FlexO frames of 25G are merged into a whole FlexO frame. The bandwidth of the whole FlexO frame is 75G, and the bandwidth of each cell in the whole FlexO frame is about 15M. The merge here is only a logical operation to facilitate the calculation of the cell location occupied by the ODU service, and the FlexO frames are not merged actually.

The number of cells occupied by an ODU service of 10G is $10*1000/15 \approx 666.67$, that is, 667 cells are occupied.

The locations of the 667 cells occupied by the ODU service of 10G in 5130 cells of the whole FlexO frame are calculated according to the sigma-delta algorithm.

The ODU service data of 10G is carried in turn in the cells corresponding to three FlexO frames which are sorted in order of numbers from small to large, that is, the first 128-bit of the ODU service is placed on the first corresponding cell of the FlexO frame numbered 1. The second 128-bit of the ODU service is placed on the first corresponding cell of the FlexO frame numbered 2, the third 128-bit of the ODU service is placed on the first corresponding cell of the FlexO frame numbered 3, the fourth 128-bit of the ODU service is placed on the second corresponding cell of the FlexO frame numbered 1, and so on. After the mapping, the cell locations of the ODU service in three FlexO frames are the same, and 667 cells are allocated to the ODU service in each FlexO frame, so the whole operation may be completed using only one set of logic.

The number of the ODU service and the number of cells occupied are stored in the overhead of the FlexO frame numbered 1, while the other FlexO frames are not carried, and the data is sent through three optical modules of 25G.

At the receiving end, the data is received from three optical modules and aligned, the FlexO frame is restored, the number of the ODU service and information of the occupied cell are extracted from the overhead of the FlexO frame numbered 1, and the location of the cell occupied by the ODU service in the FlexO frame is calculated according to the sigma-delta algorithm.

According to the obtained locations, the data is extracted in order of numbers of the locations from small to large to form the ODU service, that is, the data is extracted from the first corresponding cell of the FlexO frame numbered 1 as the first 128-bit of the ODU service, the data is extracted from the first corresponding cell of the FlexO frame numbered 2 as the second 128-bit of the ODU service, the data is extracted from the first corresponding cell of the FlexO frame numbered 3 as the third 128-bit of the ODU service, the data is extracted from the second corresponding cell of the FlexO frame numbered 1 as the fourth 128-bit of the ODU service, and so on, until the service is extracted.

Second Scenario

Figure 15:
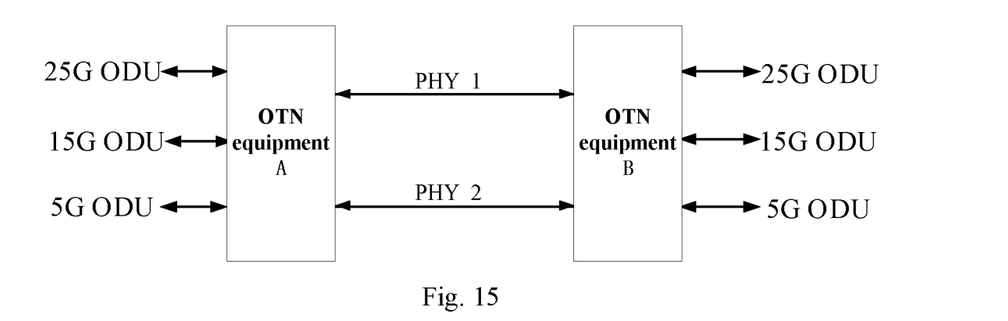
FIG. 15 is a schematic diagram of networking of a FlexO in the second scenario according to the second embodiment of the present disclosure.

In the application scenario, two pieces of OTN equipment transmit three ODU services the bandwidth of which are respectively 5G, 15G and 25G by binding the FlexO transmission groups of two PHY links of 25G. The numbers of the FlexO frames on the two PHY links are respectively 1 and 2, as shown in FIG. 15. The service transmission process in the scenario includes that:

the size of cell is set to 128 bits, the size of net load area of a FlexO frame is (128*5140−1280)=656640 bits, a total of 656640/128=5130 cells may be defined, and the bandwidth of each cell is FlexO net load bandwidth/5130, which is about 5M.

At the sending end, two FlexO frames of 25G are merged into a whole FlexO frame. The bandwidth of the whole FlexO frame is 50G, and the bandwidth of each cell in the whole FlexO frame is about 10M. The merge here is only a logical operation to facilitate the calculation of the cell location occupied by the ODU service, and the FlexO frames are not merged actually.

The number of cells occupied by the ODU service of 25G is 25*1000/10=2500, that is, 2500 cells are occupied. The number of cells occupied by the ODU service of 15G is 15*1000/10=1500, that is, 1500 cells are occupied. The number of cells occupied by the ODU service of 5G is 5*1000/10=500, that is, 500 cells are occupied.

The locations of the 2500 cells occupied by the ODU service of 25G in 5130 cells of the whole FlexO frame, the locations of the 1500 cells occupied by the ODU service of 15G in 5130−2500=2630 cells of the whole FlexO frame, and the locations of the 500 cells occupied by the ODU service of 5G in 5130−2500−1500=1130 cells of the whole FlexO frame are calculated according to the sigma-delta algorithm.

Figure 16:
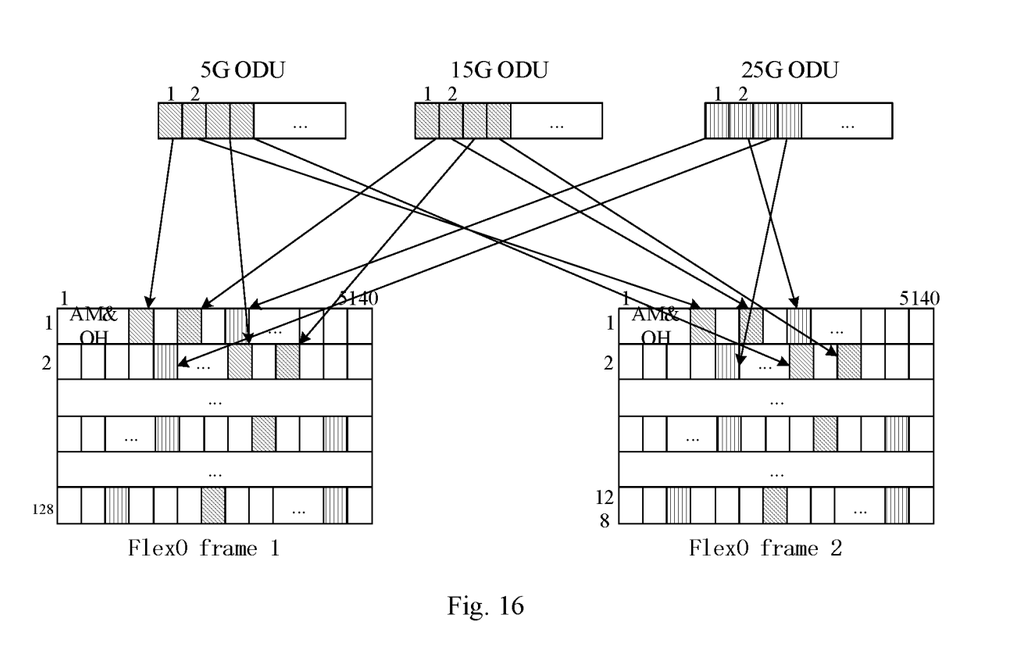
FIG. 16 is a schematic diagram of mapping customer service data into a FlexO frame according to the second embodiment of the present disclosure.

The ODU service data of 25G is carried in turn in the cells corresponding to two FlexO frames which are sorted in order of numbers from small to large, that is, referring to FIG. 16, the first 128-bit of the ODU service of 25G is placed on the first corresponding cell of the FlexO frame numbered 1, the second 128-bit of the ODU service of 25G is placed on the first corresponding cell of the FlexO frame numbered 2, the third 128-bit of the ODU service of 25G is placed on the second corresponding cell of the FlexO frame numbered 1, the fourth 128-bit of the ODU service of 25G is placed on the second corresponding cell of the FlexO frame numbered 2, and so on. The ODU service of 15G and the ODU service of 5G are implemented in the same way. After the mapping, the cell locations of the ODU service in the two FlexO frames are the same, and 2500 cells, 1500 cells and 500 cells are allocated to the ODU service of 25G, the ODU service of 15G and the ODU service of 5G in each FlexO frame 1, so the whole operation may be completed using only one set of logic.

The number of the ODU service of 25G and the number of cells occupied by it are stored in the overhead of the first FlexO multi-frame on the PHY link numbered 1, the number of the ODU service of 15G and the number of cells occupied by it are stored in the overhead of the first FlexO multi-frame on the PHY link numbered 2, the number of the ODU service of 10G and the number of cells occupied by it are stored in the overhead of the second FlexO multi-frame on the PHY link numbered 1, the corresponding location of the overhead of the second FlexO multi-frame on the PHY link numbered 2 is reserved. The data is sent through two optical modules of 25G.

At the receiving end, the data is received from two optical modules and aligned, the FlexO frame is restored, the number of the ODU service of 25G and information of the occupied cell are extracted from the overhead of the first FlexO multi-frame numbered 1, the number of the ODU service of 15G and information of the occupied cell are extracted from the overhead of the first FlexO multi-frame numbered 2, the number of the ODU service of 5G and information of the occupied cell are extracted from the overhead of the second FlexO multi-frame numbered 1, and the location of the cell occupied by the ODU service in the FlexO frame is calculated according to the sigma-delta algorithm.

According to the obtained locations, the data is extracted in order of numbers of the locations from small to large to form the ODU service, that is, the data is extracted from the first corresponding cell of the FlexO frame numbered 1 as the first 128-bit of the ODU service, the data is extracted from the first corresponding cell of the FlexO frame numbered 2 as the second 128-bit of the ODU service, the data is extracted from the second corresponding cell of the FlexO frame numbered 3 as the third 128-bit of the ODU service, the data is extracted from the second corresponding cell of the FlexO frame numbered 2 as the fourth 128-bit of the ODU service, and so on, until the service is extracted.

It is apparent that those skilled in the art should appreciate that the above modules and steps in the embodiments of the present disclosure may be implemented by a general-purpose computing device, and they may be centralized in a single computing device or distributed on a network composed of multiple computing devices; optionally, they may be implemented by a program code which is capable of being executed by the computing device, so that they may be stored in computer storage media (an ROM/RAM, a magnetic disk, and a compact disc) and executed by the computing device; and in some situations, the presented or described steps may be executed in an order different from that described here; or they are made into integrated circuit modules, respectively; or multiple modules and steps of them are made into a single integrated circuit module to realize. Therefore, the present disclosure is not limited to any particular combination of hardware and software.

The above contents are further elaborations of the embodiments of the present disclosure made with reference to the exemplary implementation modes, but it should not be considered that the specific implementation of the present disclosure is limited to these elaborations. On the premise of not departing from the conception of the present disclosure, those ordinary skill in the art to which the present disclosure belongs may also make some simple deductions and replacements, which should fall within the scope of protection of the present disclosure.

INDUSTRIAL APPLICABILITY

In the embodiments of the present disclosure, a set of logic is used to directly map the customer service data into the N FlexO frames on the M PHY links of the FlexO transmission group, which can minimize complexity and logical resources needing to be occupied.

What is claimed is:

1. A service transmission method using a Flexible Optical Transport Network (FlexO), comprising:
    mapping customer service data into N FlexO frames on M Physical Layer (PHY) links of a FlexO transmission group; and
    sending the N FlexO frames through the FlexO transmission group;
    the FlexO transmission group comprises M PHY links, wherein the M is greater than or equal to 1, and the N is greater than or equal to the M; the customer service data occupies the same number of cells in the FlexO frame of each PHY link, and cell locations of the occupied cells are the same.

2. The service transmission method using a FlexO as claimed in claim 1, wherein the customer service data comprises at least one of: Optical Channel Data Unit (ODU) service data, Ethernet service data, and Synchronous Digital Hierarchy (SDH) service data.

3. The service transmission method using a FlexO as claimed in claim 2, wherein the number of cells included in the N FlexO frames and a cell bandwidth of each cell are the same; mapping the customer service data into the N FlexO frames on M PHY links of the FlexO transmission group comprises:
    dividing a service bandwidth of the customer service data by N times the cell bandwidth, and rounding up the quotient to obtain the number of cells needing to be occupied by the customer service data in each FlexO frame;
    determining the location of each cell needing to be occupied by the customer service data in each FlexO frame according to the number of cells needing to be occupied by the customer service data in each FlexO frame and the number of currently remaining idle cells in each FlexO frame; and
    sequentially mapping the customer service data to the cell at the corresponding location in each FlexO frame.

4. Sending end equipment, comprising: a first processor, a first memory and a first communication bus;
    the first communication bus is configured to realize a communication connection between the first processor and the first memory;
    the first processor is configured to execute one or more first programs stored in the first memory, to implement steps of the service transmission method as claimed in claim 2.

5. The service transmission method using a FlexO as claimed in claim 1, wherein the number of cells included in the N FlexO frames and a cell bandwidth of each cell are the same; mapping the customer service data into the N FlexO frames on M PHY links of the FlexO transmission group comprises:
    dividing a service bandwidth of the customer service data by N times the cell bandwidth, and rounding up the quotient to obtain the number of cells needing to be occupied by the customer service data in each FlexO frame;
    determining the location of each cell needing to be occupied by the customer service data in each FlexO frame according to the number of cells needing to be occupied by the customer service data in each FlexO frame and the number of currently remaining idle cells in each FlexO frame; and
    sequentially mapping the customer service data to the cell at the corresponding location in each FlexO frame.

6. The service transmission method using a FlexO as claimed in claim 5, wherein sequentially mapping the customer service data to the cell at the corresponding location in each FlexO frame comprises:
    sequentially mapping the customer service data to the cell at the corresponding location in each FlexO frame in order of frame numbers of the FlexO frames from small to large.

7. The service transmission method using a FlexO as claimed in claim 5, wherein after obtaining the number of cells needing to be occupied by the customer service data in each FlexO frame, further comprising:
    setting the number of cells needing to be occupied by the customer service data in each FlexO frame and a service type of the customer service data in an overhead of at least one FlexO frame.

8. Sending end equipment, comprising: a first processor, a first memory and a first communication bus;
    the first communication bus is configured to realize a communication connection between the first processor and the first memory;
    the first processor is configured to execute one or more first programs stored in the first memory, to implement steps of the service transmission method as claimed in claim 5.

9. Sending end equipment, comprising: a first processor, a first memory and a first communication bus;
    the first communication bus is configured to realize a communication connection between the first processor and the first memory;
    the first processor is configured to execute one or more first programs stored in the first memory, to implement steps of the service transmission method as claimed in claim 1.

10. A computer-readable storage medium, storing one or more first programs; the one or more first program can be executed by one or more processor, to implement steps of the service transmission method as claimed in claim 1.

11. A service transmission method using a Flexible Optical Transport Network (FlexO), comprising:
    receiving N FlexO frames transmitted by using a FlexO transmission group; and
    sequentially extracting customer service data from the N FlexO frames;
    the FlexO transmission group comprises M PHY links, wherein the M is greater than or equal to 1; the N FlexO frames are the FlexO frames in the M PHY links; and the customer service data occupies the same number of cells in the FlexO frame of each PHY link, and cell locations of the occupied cells are the same.

12. The service transmission method using a FlexO as claimed in claim 11, wherein the overhead of at least one FlexO frame comprises the number of cells occupied by the customer service data in each FlexO frame and the service type of the customer service data;
  sequentially extracting the customer service data from the N FlexO frames comprises:
  determining the location of each cell occupied by the customer service data in each FlexO frame according to the number of cells occupied by the customer service data in each FlexO frame;
  sequentially extracting the customer service data from the cell at the corresponding location in each FlexO frame; and
  determining based on the service type whether to transform the extracted customer service data.

13. Receiving end equipment, comprising: a second processor, a second memory and a second communication bus;
  the second communication bus is configured to realize a communication connection between the second processor and the second memory;
  the second processor is configured to execute one or more second programs stored in the second memory, to implement steps of the service transmission method as claimed in claim 12.

14. Receiving end equipment, comprising: a second processor, a second memory and a second communication bus;
  the second communication bus is configured to realize a communication connection between the second processor and the second memory;
  the second processor is configured to execute one or more second programs stored in the second memory, to implement steps of the service transmission method as claimed in claim 11.

15. A service transmission device using a Flexible Optical Transport Network (FlexO), comprising:
  a data processing module, configured to map customer service data into N FlexO frames on M Physical Layer (PHY) links of a FlexO transmission group; and
  a data sending module, configured to send the N FlexO frames through the FlexO transmission group;
  the FlexO transmission group comprises M PHY links, wherein the M is greater than or equal to 1, and the N is greater than or equal to the M, the customer service data occupies the same number of cells in the FlexO frame of each PHY link, and the cell locations of the occupied cells are the same.

16. The service transmission device using a FlexO as claimed in claim 15, wherein the bandwidth of the M PHY links is equal to the bandwidth of their respective FlexO frames.

17. The service transmission device using a FlexO as claimed in claim 16, wherein the N FlexO frames comprise the same number of cells and each cell has the same cell bandwidth; the data processing module is configured to divide a service bandwidth of the customer service data by N times the cell bandwidth, and round up the quotient to obtain the number of cells needing to be occupied by the customer service data in each FlexO frame; the data processing module is further configured to determine the location of each cell needing to be occupied by the customer service data in each FlexO frame according to the number of cells needing to be occupied by the customer service data in each FlexO frame and the number of currently remaining idle cells in each FlexO frame, and map the customer service data in turn to the cell at the corresponding location in each FlexO frame.

18. The service transmission device using a FlexO as claimed in claim 16, wherein the data processing module is further configured to set the number of cells needing to be occupied by the customer service data in each FlexO frame and a service type of the customer service data in an overhead of at least one FlexO frame after obtaining the number of cells needing to be occupied by the customer service data in each FlexO frame.

19. The service transmission device using a FlexO as claimed in claim 15, wherein the N FlexO frames comprise the same number of cells and each cell has the same cell bandwidth; the data processing module is configured to divide a service bandwidth of the customer service data by N times the cell bandwidth, and round up the quotient to obtain the number of cells needing to be occupied by the customer service data in each FlexO frame; the data processing module is further configured to determine the location of each cell needing to be occupied by the customer service data in each FlexO frame according to the number of cells needing to be occupied by the customer service data in each FlexO frame and the number of currently remaining idle cells in each FlexO frame, and map the customer service data in turn to the cell at the corresponding location in each FlexO frame.

20. The service transmission device using a FlexO as claimed in claim 15, wherein the data processing module is further configured to set the number of cells needing to be occupied by the customer service data in each FlexO frame and a service type of the customer service data in an overhead of at least one FlexO frame after obtaining the number of cells needing to be occupied by the customer service data in each FlexO frame.

* * * * *